United States Patent
Prince, Jr. et al.

(10) Patent No.: US 8,032,637 B2
(45) Date of Patent: Oct. 4, 2011

(54) BALANCED CONSISTENT HASHING FOR DISTRIBUTED RESOURCE MANAGEMENT

(75) Inventors: Harold B. Prince, Jr., Palo Alto, CA (US); Balemurughan Kumaresan, East Palo Alto, CA (US); Kai Chiu Wong, Saratoga, CA (US)

(73) Assignee: Symantec Corporation, Mountain View, CA (US)

( * ) Notice: Subject to any disclaimer, the term of this patent is extended or adjusted under 35 U.S.C. 154(b) by 220 days.

(21) Appl. No.: 12/414,097

(22) Filed: Mar. 30, 2009

(65) Prior Publication Data

US 2010/0146122 A1 Jun. 10, 2010

Related U.S. Application Data

(63) Continuation-in-part of application No. 11/964,264, filed on Dec. 26, 2007.

(51) Int. Cl.
*G06F 15/173* (2006.01)
(52) U.S. Cl. .......................... 709/226; 709/223
(58) Field of Classification Search .................. 709/223, 709/226
See application file for complete search history.

(56) References Cited

U.S. PATENT DOCUMENTS

| | | | |
|---|---|---|---|
| 5,612,865 A | 3/1997 | Dasgupta | |
| 6,751,616 B1 * | 6/2004 | Chan | 1/1 |
| 6,978,398 B2 * | 12/2005 | Harper et al. | 714/13 |
| 2002/0156892 A1 * | 10/2002 | Karger et al. | 709/225 |
| 2002/0162047 A1 * | 10/2002 | Peters et al. | 714/5 |
| 2006/0129783 A1 * | 6/2006 | Zohar et al. | 711/170 |
| 2006/0265420 A1 * | 11/2006 | Macnaughton et al. | 707/104.1 |

* cited by examiner

*Primary Examiner* — Wing Chan
*Assistant Examiner* — David Yi
(74) *Attorney, Agent, or Firm* — Advantedge Law Group

(57) ABSTRACT

A method, system, computer-readable storage medium and apparatus for balanced and consistent placement of resource management responsibilities within a multi-computer environment, such as a cluster, that are both scalable and make efficient use of cluster resources are provided. Embodiments reduce the time that a cluster is unavailable due to redistribution of resource management responsibilities by reducing the amount of redistribution of those responsibilities among the surviving cluster members. Embodiments further provide redistribution of resource management responsibilities based upon relative capabilities of the remaining cluster nodes.

20 Claims, 13 Drawing Sheets

1300

| State 1302 | 0 0 0 0 1 1 1 1 2 2 2 2 3 3 3 3 |
| State 1304 | X X X X 1 1 1 1 2 2 2 2 3 3 3 3 |
| State 1306 | 1 1 2 3 1 1 1 1 2 2 2 2 3 3 3 3 |
| State 1308 | 1 1 2 3 1 1 X X 2 2 X X 3 3 X X |
| State 1310 | 1 1 2 3 1 1 0 0 2 2 0 0 3 3 4 4 |

*FIG. 13*

BALANCED CONSISTENT HASHING FOR DISTRIBUTED RESOURCE MANAGEMENT

CROSS REFERENCE TO RELATED APPLICATION

This application is a continuation-in-part of U.S. application Ser. No. 11/964,264, filed 26 Dec. 2007, and titled "Balanced Consistent Hashing for Distributed Resource Management," the disclosure of which is incorporated, in its entirety, by this reference.

FIELD OF THE DISCLOSURE

The present disclosure relates to computer resource management, and particularly to a system and method for distributing resource management responsibilities in a multiple computer network.

BACKGROUND

An ever-increasing reliance on information and the computing systems that produce, process, distribute, and maintain such information in its various forms continues to put great demands on techniques for providing information resources and access to those information resources. Many businesses and organizations have a need not only for a significant amount of computing resources, but also for those resources to be available with a minimal amount of downtime. One solution for such requirements is an environment in which computing resources are clustered together thereby providing a flexible, high-performance, and highly available platform to access shared data in a storage area network environment. A cluster-wide volume and file system configuration allows for simplified and centralized management. An additional benefit is the provision of an integrated cluster volume manager that presents every node in the cluster with the same logical view of the shared device configurations.

An advantage of a cluster environment is the ability to eliminate, or substantially reduce, single points of failure for the access of information. Every compute node in the cluster is provided with the same view of the shared data resources and can access those data resources in the same manner. Thus, if one or more of the compute resources suffers a failure, tasks being performed by the failed systems can be transferred to another computer node for further processing. In order to effectively provide for the elimination, or reduction, of single points of failure with regard to cluster resource management, management is distributed among the member nodes of the cluster.

When a cluster member leaves the cluster, provision must be made for distributing the resource management responsibilities of that node among the remaining cluster members. It is desirable that such redistribution of resource management responsibilities be performed in a manner that makes efficient use of cluster resources, such as compute cycles and network bandwidth. It is further desirable that such redistribution of resource management responsibilities take into account the relative capabilities of the remaining cluster members. It is also desirable that in the performance of redistribution of resource management responsibilities among the cluster members that movement of resource management responsibilities among the remaining nodes be minimized.

SUMMARY

The present disclosure provides a mechanism for balanced and consistent placement of resource management responsibilities within a multi-computer environment, such as a cluster, that is both scalable and makes efficient use of cluster resources. Embodiments of the present disclosure reduce the time that a cluster is unavailable due to redistribution of resource management responsibilities by reducing the amount of redistribution of those responsibilities among the surviving cluster members. Embodiments of the present disclosure further provide redistribution of resource management responsibilities based upon relative capabilities of the remaining cluster nodes.

In one embodiment of the present disclosure, a plurality of resource identifiers in a resource identification space are identified, the resource identification space is divided into regions of responsibility, and then management responsibility for each region of responsibility is assigned to a corresponding network node. In one aspect of the above embodiment, the resource identification space is a name space, and in a further aspect the names of resources are hashed to determine location within the name space. In another aspect of the above embodiment, the network nodes assigned responsibility for the regions of the resource identification space are members of a cluster of network nodes. In a further aspect of the above embodiment, the size of the area of responsibility is determined by the relative capability of the assigned network node. In another aspect of the above embodiment, when a number of available network nodes changes, due to either removal or addition of a network node, management responsibility for resources is redistributed in a manner that seeks to minimize redistribution of resource management responsibility among the network nodes.

In some embodiments of the present disclosure, redistribution of resource management responsibility among the network nodes may entail deallocating a sufficient number of regions of responsibility from network nodes that are over a target capacity and reallocating the deallocated regions to network nodes that are under a target capacity.

BRIEF DESCRIPTION OF THE DRAWINGS

The present disclosure may be better understood, and its numerous objects, features, and advantages made apparent to those skilled in the art by referencing the accompanying drawings.

FIG. 13 depicts an exemplary transformation of one lock mastership distribution to another lock mastership distribution.

DETAILED DESCRIPTION OF EXEMPLARY EMBODIMENTS

The present disclosure provides a mechanism for balanced and consistent placement of resource management responsibilities within a multi-computer environment, such as a cluster, that is both scalable and makes efficient use of cluster resources. Embodiments of the present disclosure reduce the time that a cluster is unavailable due to redistribution of resource management responsibilities by reducing the amount of redistribution of those responsibilities among the surviving cluster members. Embodiments of the present disclosure further provide redistribution of resource management responsibilities based upon relative capabilities of the remaining cluster nodes.

Cluster Environment and Distributed Locks

Figure 1:
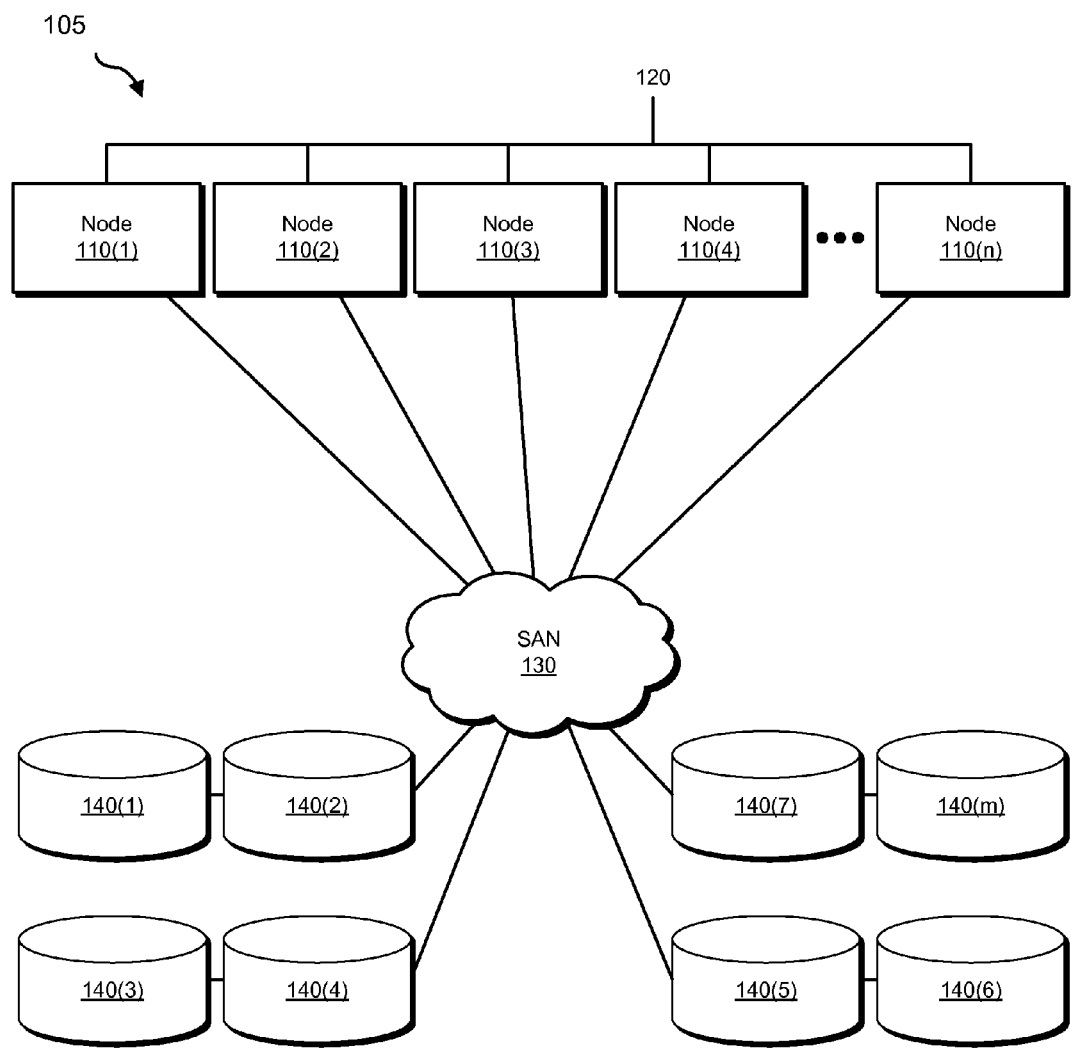
FIG. 1 is a simplified block diagram of a multi-computer network cluster configuration suitable for implementing embodiments of the present disclosure.

FIG. 1 is a simplified block diagram of a multi-computer network cluster configuration suitable for use by embodiments of the present disclosure. Cluster 105 includes compute nodes 110(1)-110(n) that are members of the cluster. Compute nodes 110(1)-110(n) are coupled by a network 120. As illustrated, compute nodes 110(1)-110(n) are also coupled to a storage area network (SAN) 130 that provides access to storage volume resources 140(1)-140(m). Alternatively, storage resources can be directly coupled to the various compute nodes via bus-based controllers or coupled, for example, as network accessible storage. Each compute node 110(1)-110(n) has concurrent access to the storage pool of SAN 130. Given this concurrent access to the storage resources, it is necessary to coordinate read/write access to the storage pool to ensure data integrity.

In a cluster environment such as that depicted in FIG. 1, a variety of resources are shared by the member nodes of the cluster. Such resources can include storage resources within SAN 130, applications that can be executed on the various member nodes of the cluster, and the like. Distribution of the management of such resources among the member nodes of the cluster eliminates, or reduces, the presence of a single point of failure to gain access to those resources.

One example of managing access to resources within the cluster is a file locking architecture associated with the cluster file system provided by the storage resources of SAN 130. The cluster file system provides a single version of all files in a cluster that are visible to all nodes in the cluster. If each member node had its own version of a particular file, especially during write access to that file, there is a likelihood of corrupt information being in possession of any one node. To ensure that during any write access to particular data there is only a single version of that data, file locks are implemented in the cluster-wide file system.

Within a single computer system, multiple threads executing a given software application may access or update the same data. The term "thread" is used to describe the context in which a computer program is executed. Coordination among the threads is necessary to ensure that one thread does not read shared data at the same time that another thread is updating that data, thereby possibly resulting in data inconsistency depending upon the timing of the two operations. In a cluster environment, such as that in FIG. 1, where processing for a given software application can be load balanced among the various member nodes, threads that share data can be running on different nodes within the cluster.

Coordination between threads accessing shared data can be implemented using locks. Typically, a lock protects a piece of shared data, for example, a file or a disk block. In a distributed system, such as a cluster, a lock can also protect shared "state" information distributed in memories of each node in the system, such as the online or offline status of a given software application. All shared data is protected by a lock, and locks are typically managed by a lock manager that provides an interface to be used by other application programs to access that data.

A lock to data is requested before the calling application program can access the data protected by the lock. A calling application program can typically request an "exclusive" lock to write or update data protected by the lock or a "shared" lock to read data protected by the lock. If the calling application is granted an exclusive lock, then the lock manager guarantees that the calling program is the only thread holding the lock. If the calling program is granted a shared lock, then other threads may also be holding shared locks on the data, but no other thread can hold an exclusive lock on the data.

The lock manager cannot always grant a lock request right away. Consider an example where one thread has an exclusive lock L on a given set of data, and a second thread requests shared access to the given set of data. The second thread's request cannot be granted until the first thread has released the exclusive lock on the given set of data.

A lock can be placed on data that is stored on a shared disk, such as the volumes accessible through SAN 130. Locks can also be placed on shared data stored in memory for each node, where the data must be consistent for all nodes in a cluster. For example, nodes in a cluster can share information indicating that a file system is mounted. A lock can be placed on the shared state information when the state of the file system changes from mounted to not mounted or vice versa.

Distributed Lock Management

As stated above, a lock manager responds to requests for access to data protected by a lock. In a cluster environment, it is desirable that resource managers, such as lock managers, be distributed throughout the member nodes of the cluster in order to provide for the desired elimination or reduction of a single point of failure and to provide for better performance through load distribution.

Figure 2:
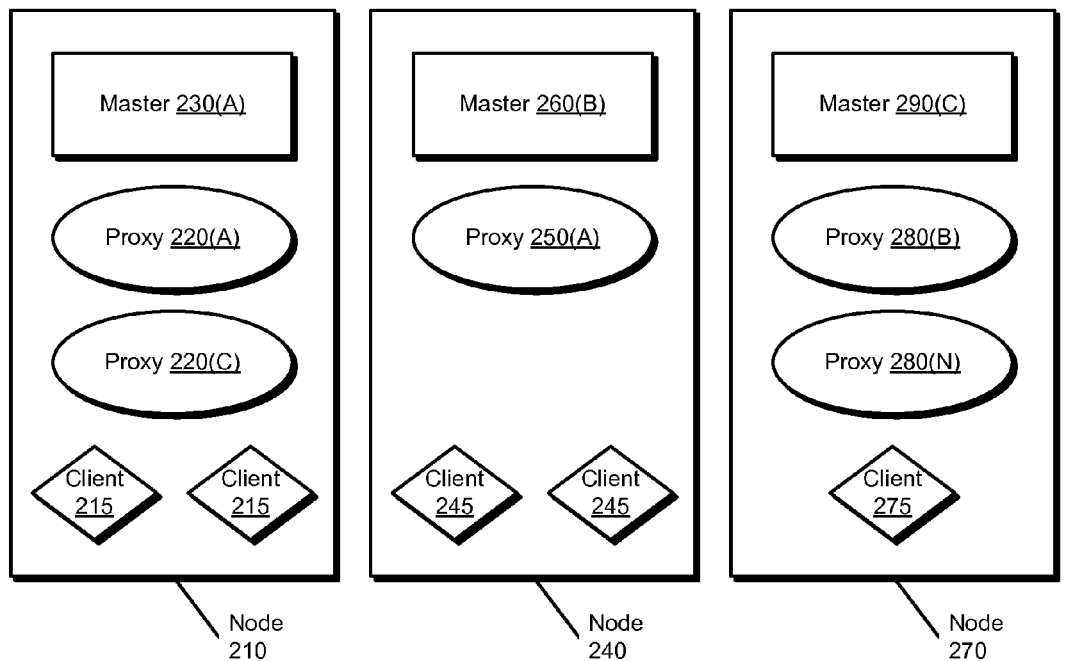
FIG. 2 is a simplified block diagram of a two-level lock manager environment that provides distributed lock management, usable by embodiments of the present disclosure.

FIG. 2 is a simplified block diagram of a two-level lock manager environment that provides distributed lock management, usable by embodiments of the present disclosure. For example, client thread 215 in node 210 requests a Lock A through Proxy 220(A). In such a system, there is one proxy per lock per node that holds or requests the lock. For example, there can also be a proxy for Lock A on node 240 (Proxy 250(A)) that corresponds to a client 245 holding or requesting the Lock A on node 240. However, if node 240 does not already have access to Lock A, then Proxy 250(A) will request Lock A from the master for Lock A. As illustrated in FIG. 2, the master for Lock A is Master 230(A) located on node 210. There is one master per lock in the cluster. If the master is not located on the node executing the requesting thread, then a master table located on the node is consulted to find the identification of a remote node providing the master for the requested lock. For example, if a client requested a Lock C from Proxy 220(C) on node 210, then Proxy 220(C) would request Lock C from Lock C Master 290(C) located on node 270. Should node 210 already have been granted Lock A for a different thread, then Proxy 220(C) can manage distribution of Lock C to the requesting client without further request to a lock master.

Since the nodes within a cluster are not necessarily homogeneous, either in the type or configuration of the computer that comprises the node or in the processes executing on the node, it is desirable to distribute the various lock masters according to the relative capabilities of the cluster member nodes in order to fairly distribute the load for mastering these resources. Factors involved in determining a node's capability can include, for example, processor speed, number of processors on the node, available memory size, and desired load on the node. Capability of a node can be automatically detected or an administrator of the cluster can define the capability and that information can be used in determining distribution of lock masters among the various nodes.

Figure 3:
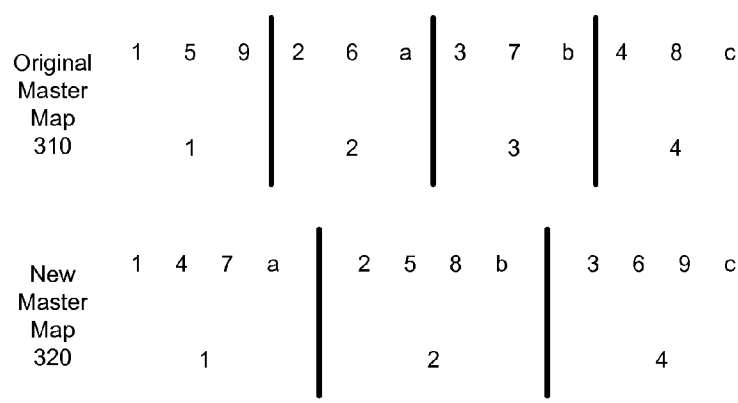
FIG. 3 is an illustration of how lock masters can be distributed among the various member nodes of a cluster.

FIG. 3 is an illustration of how lock masters can be distributed among the various member nodes of a cluster. An original master map 310 illustrates how Lock Masters 1-c are associated with members of a four-node cluster. In this illustration, the Lock Masters are evenly distributed across the nodes based upon the name of the locks associated with the masters. Lock names are uniquely determined from, for example, file system information such as inode, lock type, or volume.

One method for distributing the lock master uses a hashing of the lock name. The node ID that is to host the master for the lock is determined as the hash value (modulo n), where n is the number of nodes available to host masters in the cluster. If a node leaves the cluster (e.g., node 3), then a new master map 320 is generated using the same algorithm. Thus, because the host ID for the master is based upon hash value (modulo n), most of the lock masters are relocated among the surviving nodes. The number of masters that are relocated is ((n−1)/n) *number of lock masters.

Under the system illustrated in FIG. 3, since most of the masters have to be relocated, it is reasonable to discard all of the old master information and rebuild new master tables on each cluster node. Once the new masters have been redistributed, the surviving proxies then send lock states to the various new masters. One problem with such a system is that as the number of locks and the cluster size increases, an increasing amount of cluster unavailability is incurred while waiting for the masters to be redistributed and the proxies to transmit their lock states. Further, the above algorithm for determining master host IDs for the locks does not take into account relative capabilities of the nodes in performing the redistribution. Further, after a reconfiguration of the cluster processing costs are significant.

Balanced Consistent Hashing

Embodiments of the present disclosure use a mechanism of balanced consistent hashing to reduce not only the calculation involved in determining master host IDs, but also reduce the number of masters that need to be redistributed among the various surviving nodes in the cluster. A resource identification "space" is defined by identifiers for each resource whose associated master is to be distributed in the cluster. Embodiments of the present disclosure determine the extent of the resource identification space, which extends from the minimum possible hash value to the maximum possible hash value. This resource identification space is then apportioned among the cluster member nodes according to those nodes' relative capabilities. If a node should leave or enter the cluster, then the resource identification space is reapportioned among the surviving cluster member nodes.

Figure 4:
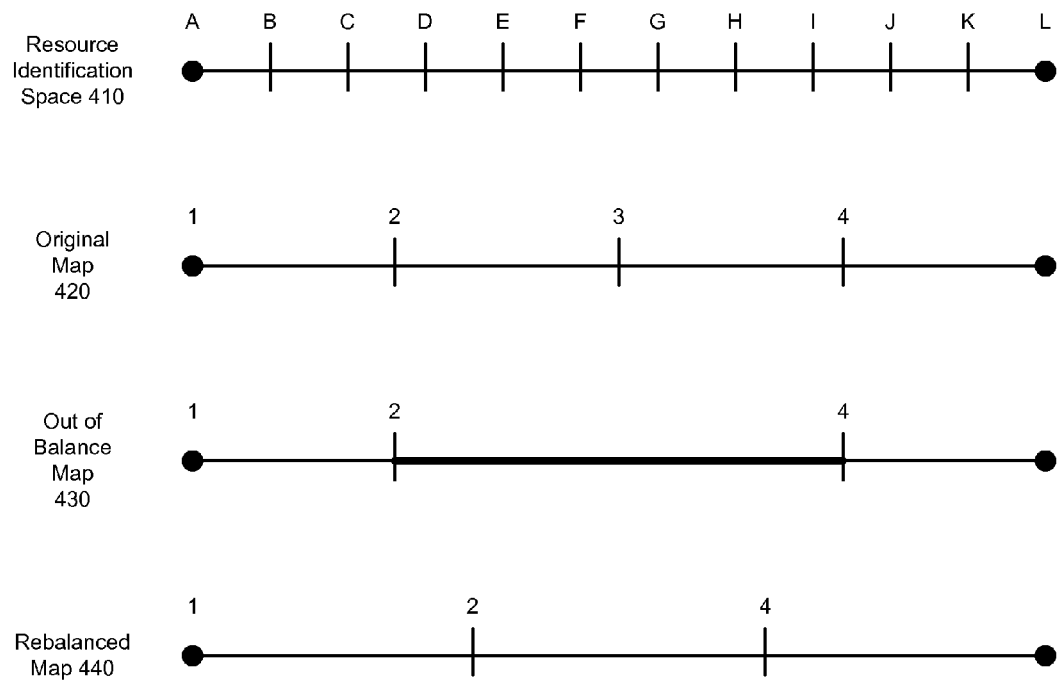
FIG. 4 is a simplified diagram illustrating distribution of locks according to a balanced consistent hashing mechanism, in accord with embodiments of the present disclosure.

FIG. 4 is a simplified diagram illustrating apportionment of locks according to a balanced consistent hashing mechanism in accord with embodiments of the present disclosure. Resource identification space 410 illustrates a distribution of hash values for lock identifiers from a minimum value to a maximum value of those hash values. For the sake of illustration, Locks A-L have been evenly distributed through the resource identification space, but it should be noted that such an even distribution is not necessary. An original mapping 420 of cluster member nodes 1-4 is further shown. For the sake of this example, a four-node cluster is used and the relative capabilities of each node are considered to be the same. Thus, each area of responsibility for the lock management hash space is evenly divided among the four nodes.

An out of balance map 430 is illustrated for a scenario in which node 3 leaves the cluster. In the illustrated scenario, the area of responsibility for node 2 is merely extended into the area responsibility for node 3, thereby making node 2 responsible for all lock management originally performed by node 3. This scenario is considered out of balance because node 2 is required to expend more resources than either nodes 1 or 4 to perform lock management tasks.

A rebalanced map 440 of lock masters is more desirable in order to have the surviving nodes more evenly share the load. As illustrated, mastering for Lock D moves from node 2 to node 1, even though node 2 remains in the cluster. Responsibility for the masters for Locks G and H, which were originally performed by node 3, is now performed by node 2. Responsibility for the master for Lock I, which was originally performed by node 3, is moved to node 4.

In performing the rebalancing for map 440, only four of the 12 lock masters are relocated after node 3 leaves the cluster. This is in comparison to the nine masters (((n−1)/n)*number of lock masters) that would be moved under the system illustrated in FIG. 3. Thus, a significant amount of resources can be conserved through the use of the balanced consistent hashing mechanism illustrated in 440 in both compute cycles required to recreate a lock master (as will be discussed more fully below) and network resources required for the various proxies to send their states to the new lock masters.

As the number of nodes and resources being mastered increases, the number of resource masters that get redistributed asymptotically approaches approximately one-third of the total number of the resource masters. The number of redistributed resource masters also is sensitive to whether a node responsible for one of the "edges" of the resource identification space versus a node responsible for the middle of the space becomes unavailable. One embodiment of the present disclosure resolves this edge sensitivity by modeling the resource identification space without edges, that is, for example, linking the "A" edge of the resource identification space 410 to the "L" edge of the resource identification space.

An alternative balanced consistent hashing method can be realized by just moving the lock masters from a node that has left the cluster to the surviving nodes. Using the example in FIG. 4, in which node 3 leaves the cluster, the lock master corresponding to Lock G can be moved to node 1, H to node 2, and I to node 4. This results in the number of masters being moved equaling 1/n, where n is the number of nodes in the original cluster.

Selection of master nodes from a set of cluster member nodes is performed using both an array of available nodes and a resource identification space. The master node ID array (master_nid[idx]) contains a sorted list of cluster member node IDs that are replicated based on a scaled weight of each node. The scaled weight of each node is based upon the relative capability of a node versus the other nodes in the array. For example, if nodes 1 and 3 carry a weight of one while node 2 carries a weight of two, then the master_nid array will contain entries {1, 2, 2, 3}. The total weight (tot_weight) of the array is the number of entries in the master_nid array. So, in the above example, tot_weight=4. A master for a lock resource can be assigned to a node represented in master_nid by calculating the hash value of the name of the lock and dividing that hash value by a maximum value in the hash value space (max_hash) and multiplying the resultant value by the total weight and using that value as the index to look up a master node ID value from the master_nid array. Thus, the equation for arriving at the index for the master_nid array is: idx=(hashval/max_hash)*tot_weight One can see that the above equation for the master_nid index calculates a normalized value for the hash of the lock name against the maximum hash value and multiplies that normalized value against the total number of entries in the master_nid array.

In one embodiment of the present disclosure, integer arithmetic is alternatively used to calculate the index of the master_nid array. In this embodiment, the index is calculated as follows: idx=(hashval11*tot_weight)>>11. Hashval11 is the least significant 11 bits of the calculated hash value for the lock name. Hashval11 is then multiplied by the total weight of the master_nid array. The resultant value is then right shifted by 11 bits to yield the index value. In this embodiment, the 11 bits and the right shifting of 11 bits are chosen in relation to a selected maximum number of hash values that can be tracked during relocation.

An alternative mechanism for balanced consistent hashing has already been discussed, in which only the lock masters associated with a node that has left the cluster are relocated, and those lock masters associated with the remaining nodes in the cluster are kept with those nodes. An example of such an embodiment is described herein. As discussed above, the master_nid array contains entries based upon the scaled weight of each node in a cluster. For a new cluster, or for an existing cluster in which a node joins, the master_nid array is stored as a level-1 mapping table. This alternative mechanism introduces a second level mapping table (e.g., a level-2 mapping table) when a node leaves the cluster. When a node leaves the cluster, those entries in the master_nid array that corresponds to a node that is no longer in the cluster are replaced by a null value, and this modified master_nid array is retained as the level-1 mapping table. A level-2 mapping table is then constructed based upon the scaled weights of the surviving nodes. The level-2 mapping table is used to redistribute masters from departed nodes to surviving nodes. During a master node ID lookup, the index for the level-1 table is calculated by one of the above-described methods. If the node ID in the level-1 mapping table is null, then a second index is calculated for the level-2 table. An example of an equation for calculating this level-2 index is as follows: idx2=(((((hashval11) & 0x3f)<<5)|((hashval11)>>6))*tot_weight2)>>11. In the above equation, hashval11 is the least-significant 11 bits of hashval and tot_weight2 is the size of the level-2 mapping table. Again, use of the least-significant 11 bits of hashval and right shifting by 11 bits relates to table sizes used for tracking relocated masters.

Although the above alternative embodiment of the present disclosure utilizes two levels of mapping tables, it should be noted that any number of levels of mapping tables can be used, each level corresponding to an event changing the number of nodes in the cluster. The number of such tables used implicates memory resources needed to store the tables, and also compute resources used in performing multiple levels of table lookup. Further, as stated above, when a new node enters the cluster, a level-1 mapping table is constructed. Thus, in the above-described embodiment, when a new node enters a cluster in the same time period that an existing node leaves the cluster, only a level-1 mapping table is constructed.

It should also be noted that although the example illustrated in FIG. 4 involves the removal of a node from the network environment and a subsequent redistribution of the resource management to the remaining nodes, the methodology also encompasses an addition of a node to the network environment and allows for the distribution of resource management responsibilities to the additional node.

Figure 5A:
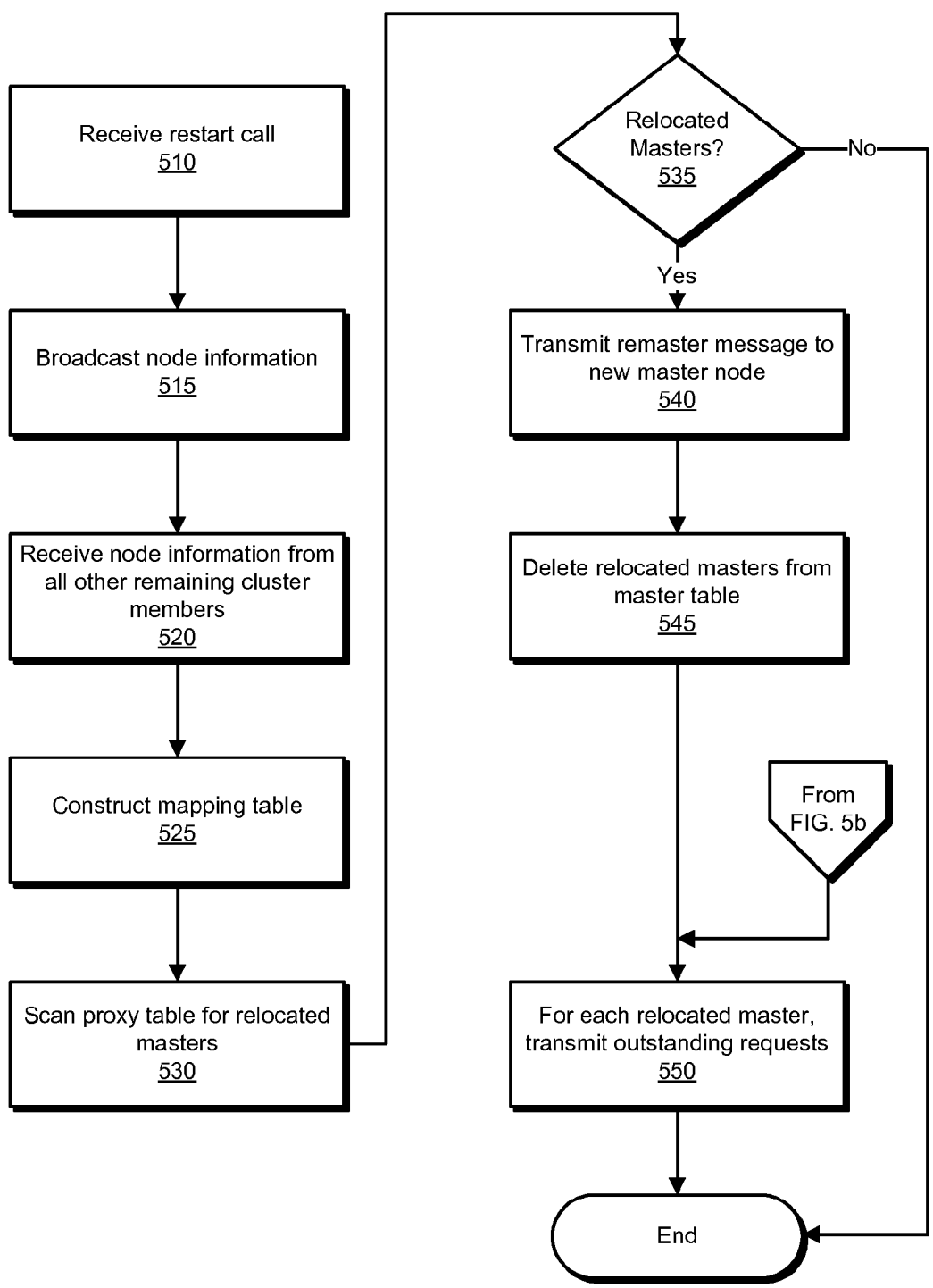
FIG. 5 is a simplified flow diagram illustrating one embodiment of tasks performed by a cluster node during a mapping table rebuild process, in accordance with embodiments the present disclosure.

FIG. 5a is a simplified flow diagram illustrating one embodiment of tasks performed by a cluster node during a mapping table rebuild process, in accordance with the present disclosure. Lock master redistribution is initiated by a restart call that is triggered by a cluster membership change (510). Such a cluster membership change can be detected by a cluster membership monitor and identified by the presence of a new membership identifier joining a cluster or the absence of a node from the cluster after a timeout period or an explicit departure indication from a node. In response to the restart call, each node in the cluster will broadcast information about that node to all the other nodes (515). Such node information includes, for example, node capability information, such as that described above, and an indication of when the node joined the cluster (e.g., a node joined time stamp). The node can then wait to receive node information from all the other remaining cluster members (520).

In light of the information received from the other nodes, each node then constructs a level-1 or level-2 mapping table, as discussed above (525). A proxy table stored at each node is scanned to determine if any of the proxies relates to a relocated master by referencing the new mapping table using the balanced consistent hashing methods discussed above and comparing the result of the reference to the new mapping table with a record of the previous masters for the proxies (e.g., a remote master table) (530). If there are no relocated masters (535) then the proxies on the node need not send information to their associated master. This is a distinguishing feature of the balanced consistent hashing method over the prior technologies in that in the prior technologies, discussed above, almost all of the masters are relocated and therefore master tables are completely reconstructed and all proxies must send information to their masters. If a proxy does have an associated relocated master (535), then a remaster message is transmitted to the node that is now responsible for mastering the lock ID (540). This is performed for each proxy having a relocated master. A node can indicate that the node has completed sending remaster messages by, for example, broadcasting a message to all nodes in the cluster that indicates that the node has finished sending remaster messages (e.g., a "DONE_REMASTER" message).

Figure 6:
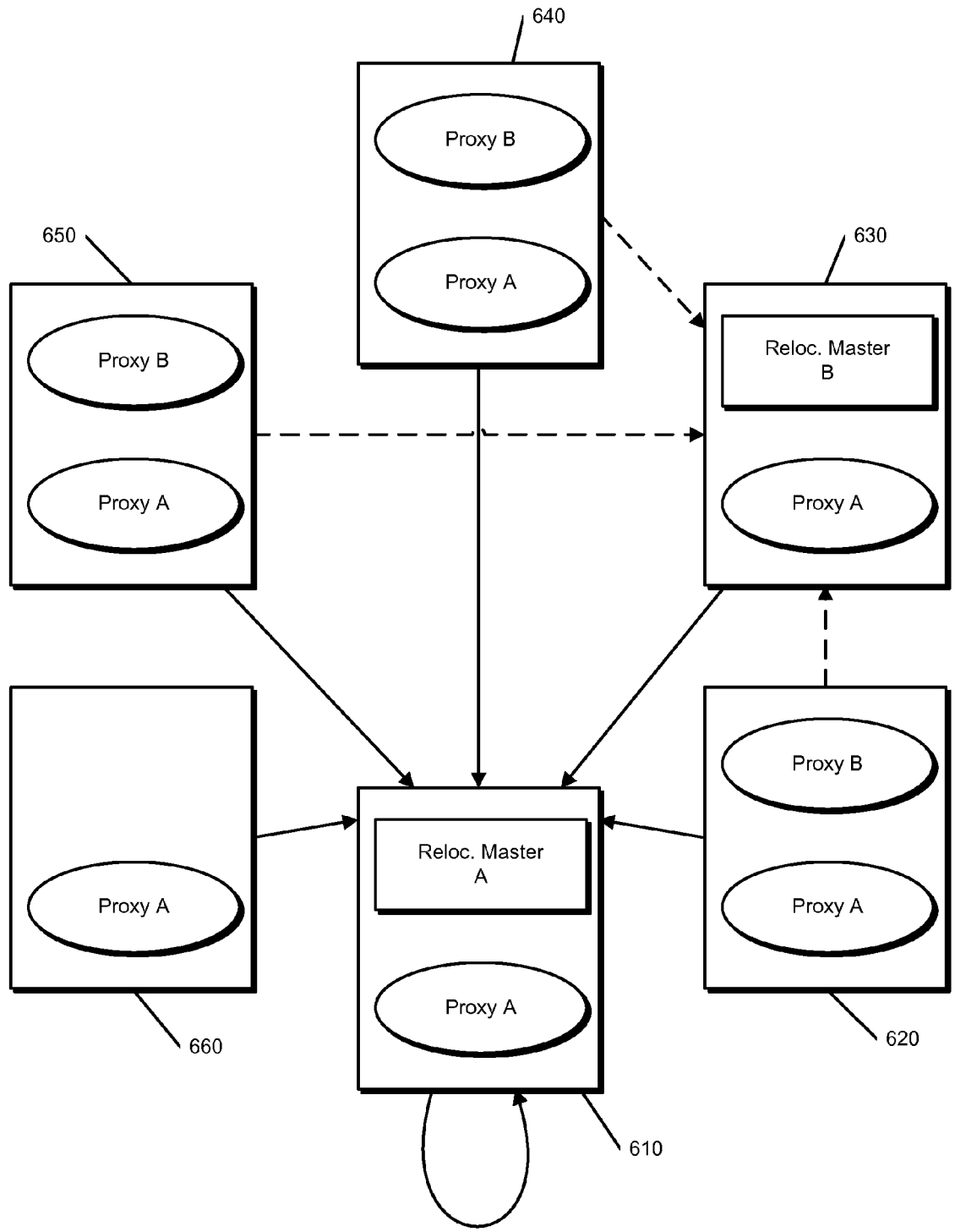
FIG. 6 is a simplified block diagram illustrating remaster message traffic between proxies and relocated masters in a cluster environment in accordance with embodiments of the present disclosure.

FIG. 6 is a simplified block diagram illustrating remaster message traffic between proxies and relocated masters in a cluster environment in accord with embodiments of the present disclosure. FIG. 6 illustrates nodes 610-660 that are members of a cluster. Node 610 is responsible for Lock Master A. Upon discovering that Lock Master A has been relocated to node 610, each node in the cluster that has a proxy for Lock A communicates a remaster message to node 610. Such a remaster message includes the state of the proxy on each node that has a proxy for Lock A. Similarly, node 630 is responsible for relocated Lock Master B, and those nodes having a proxy for Lock B transmit a remaster message to node 630. From this figure, it can be appreciated that the greater the number of relocated lock masters, the greater the amount of network traffic due to remaster messages. Further, as the number of nodes and proxies increases, the network traffic will also increase. Therefore, a mechanism by which relocation of lock masters is kept to a minimum will conserve network resources (e.g., bandwidth) significantly.

Returning to FIG. 5a, the node will also delete any masters relocated from that node from the node's master table (545). After the node modifies the node's own master table and performs housekeeping tasks on queues related to the modified master table (e.g., discussion related to FIG. 5B, below), for each relocated master associated with a proxy on the node, any outstanding requests from that node's proxies can be transmitted to the relocated master (550).

Figure 5B:
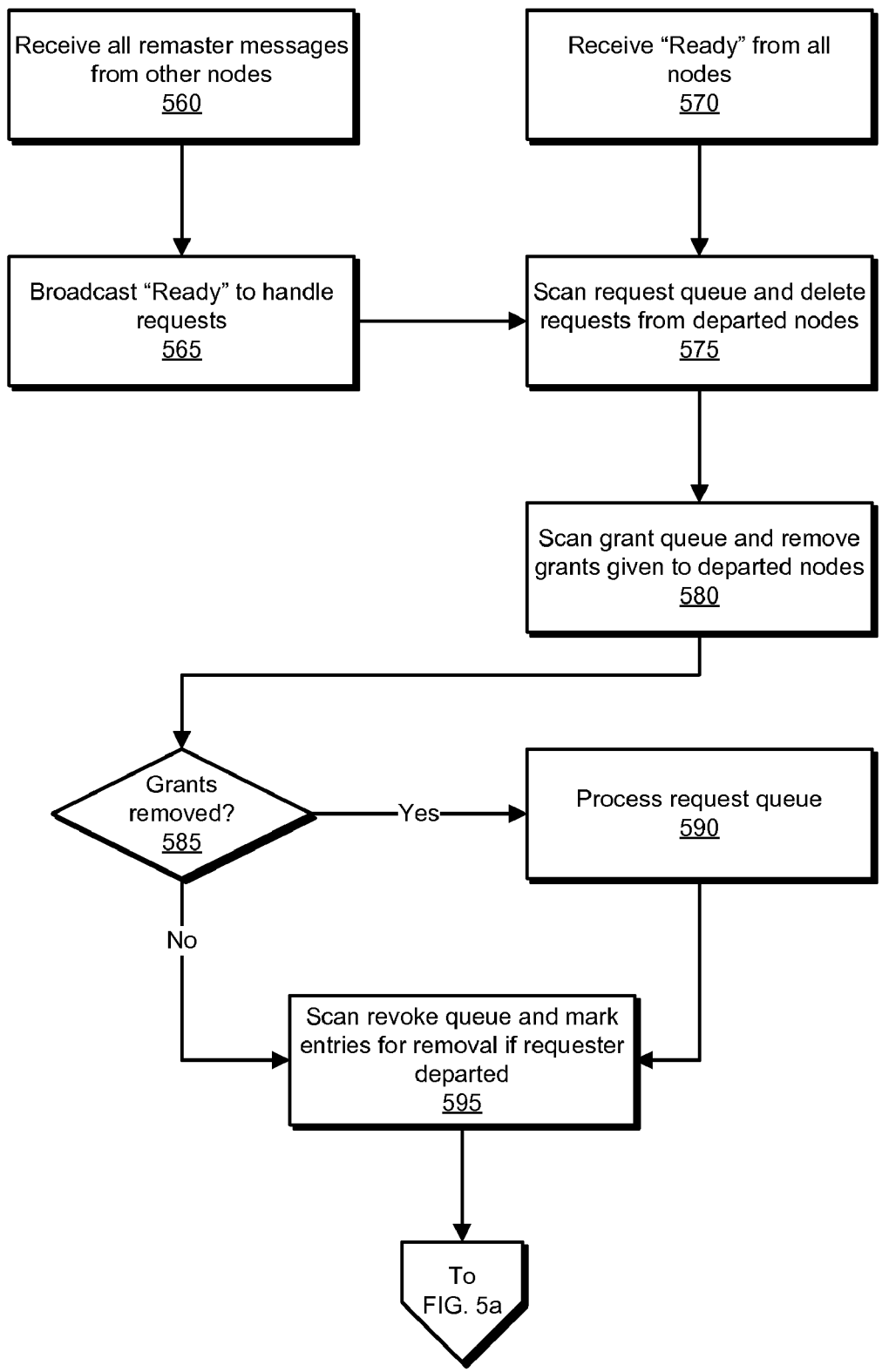

FIG. 5b is a simplified flow diagram illustrating tasks performed in housekeeping tasks related to the modified master table, in accord with embodiments of the present disclosure. A determination can then be made as to whether the node has received all remaster messages from every node (560). Such a determination can be made, for example, by determining if the node has received a "DONE_REMASTER" message from all the other cluster nodes, as described above. If not, then the node can wait for additional remaster messages. If all remaster messages have been received, then the node broadcasts an indication that it is "ready" to handle requests for the locks being mastered by that node (565). The node can then wait to receive a "ready" indication from all the other nodes in the cluster (570), and upon doing so can perform tasks related to cleaning up the master table on that node. The node can, for example, scan a request queue and delete requests for lock resources from nodes that have departed the cluster (575). The node can scan a grant queue and remove grants that have been granted to nodes that have departed the cluster (580). If grants have been removed (585), then the node can process the request queue to determine if any requested lock resources can now be granted in light of the removal of grants (590). A revoke queue for requests to revoke otherwise locked resources (by other threads) can be scanned and if a requester for a revoke has been removed from the cluster, then that entry can be deleted when all the revokes are completed instead of being promoted to the grant queue (595).

Although illustrated in sequence, many of these tasks can be performed concurrently by a node (e.g., proxy table scanning (530), deleting relocated masters (545), scanning the request and grant queues (575 and 580), and updating the master table (715, below)), thereby reducing the amount of time involved in redistribution of masters among the member nodes.

Part of the process of implementing new master tables involves removing stale messages. Stale messages that are either to or from nodes from which a master has been relocated are discarded. Stale messages can also be discarded from sending nodes that are no longer members of the cluster. Further, any messages that were sent before either the sender or the receiver joined the cluster can also be discarded.

Figure 7:
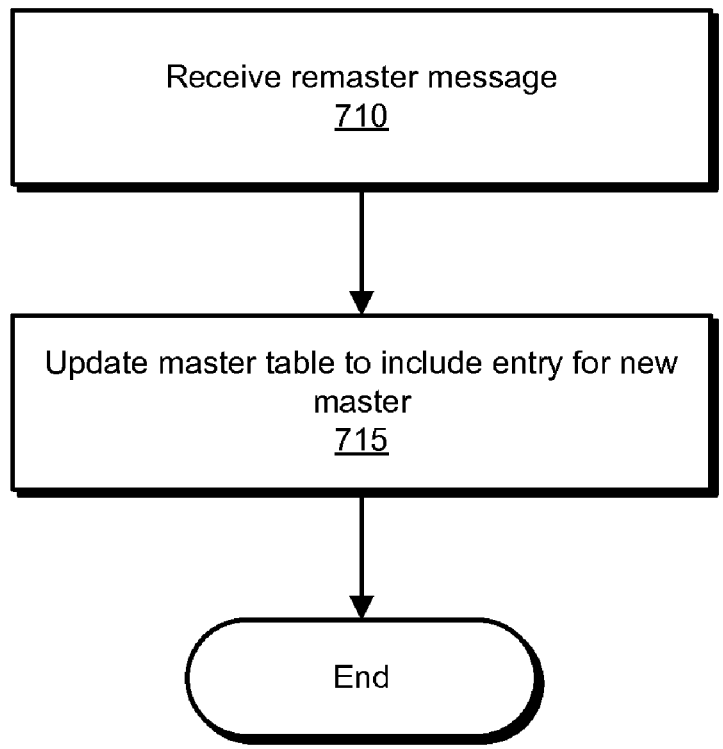
FIG. 7 is a simplified block diagram illustrating some of the tasks performed in setting up new masters on cluster nodes during a lock master redistribution, in accord with embodiments of the present disclosure.

FIG. 7 is a simplified block diagram illustrating some of the tasks performed in setting up new masters on cluster nodes during a lock master redistribution. A node begins the process upon receiving a remaster message (710), such as that sent during 540. The node then updates the master table of that node to include an entry for the new master for which the node is responsible (715).

Resource management redistribution in a network cluster environment has been described above using an example of lock resource management. It should be understood, that the concepts from the present disclosure can be applied to distributed management of other types of resources within a distributed computing environment in which such resources are shared. The principles of the present disclosure are not limited to lock management but can also be applied to, for example, management of applications in a distributed computing environment or providing a plurality of electronic mail servers each of which is responsible for a range of recipient electronic mail addresses for a network.

An Example Computing and Network Environment

As shown above, the present disclosure can be implemented using a variety of computer systems and networks. An example of one such computing and network environment is described below with reference to FIGS. 8 and 9.

Figure 8:
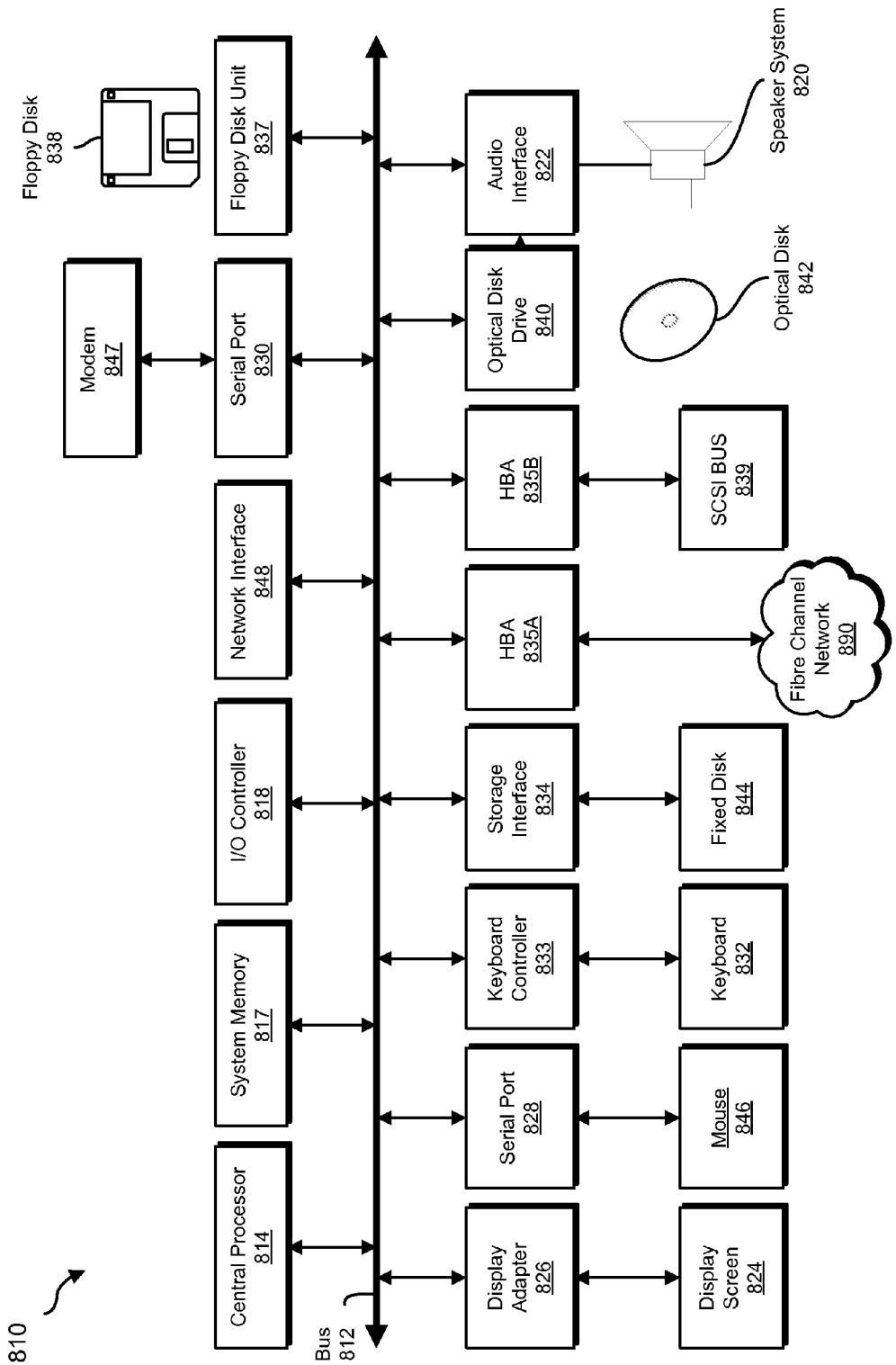
FIG. 8 depicts a block diagram of a computer system suitable for implementing embodiments of the present disclosure.

FIG. 8 depicts a block diagram of a computer system 810 suitable for implementing the present disclosure. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fibre Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
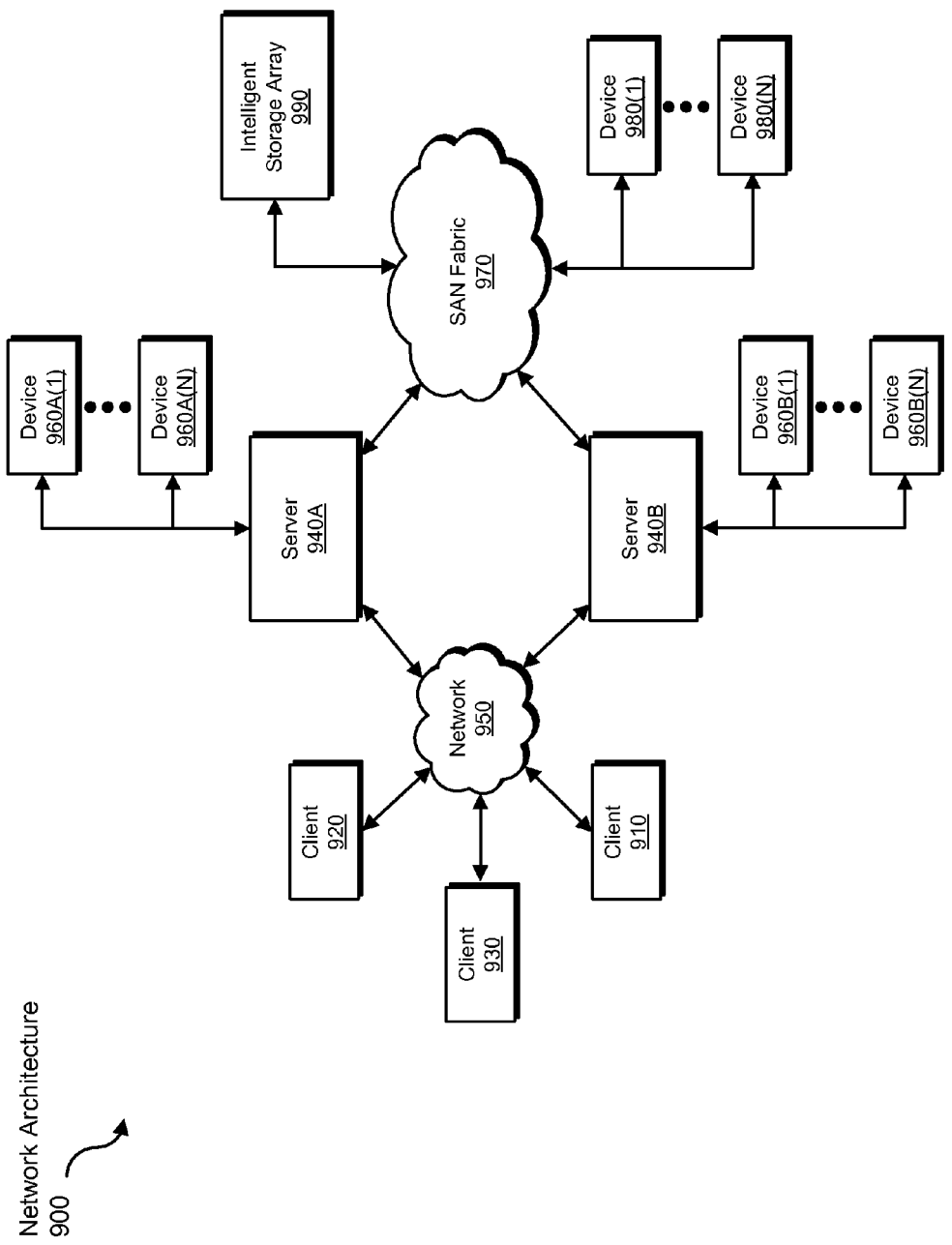
FIG. 9 is a block diagram depicting a network architecture suitable for implementing embodiments of the present disclosure.

FIG. 9 is a block diagram depicting a network architecture 900 in which client systems 910, 920 and 930, as well as storage servers 940A and 940B (any of which can be implemented using computer system 810), are coupled to a network 950. Storage server 940A is further depicted as having storage devices 960A(1)-(N) directly attached, and storage server 940B is depicted with storage devices 960B(1)-(N) directly attached. Storage servers 940A and 940B are also connected to a SAN fabric 970, although connection to a storage area network is not required for operation of the disclosure. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920 and 930 to network 950. Client systems 910, 920 and 930 are able to access information on storage server 940A or 940B using, for example, a web browser or other client software (not shown). Such a client allows client systems 910, 920 and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present disclosure is not limited to the Internet or any particular network-based environment.

Figure 10:
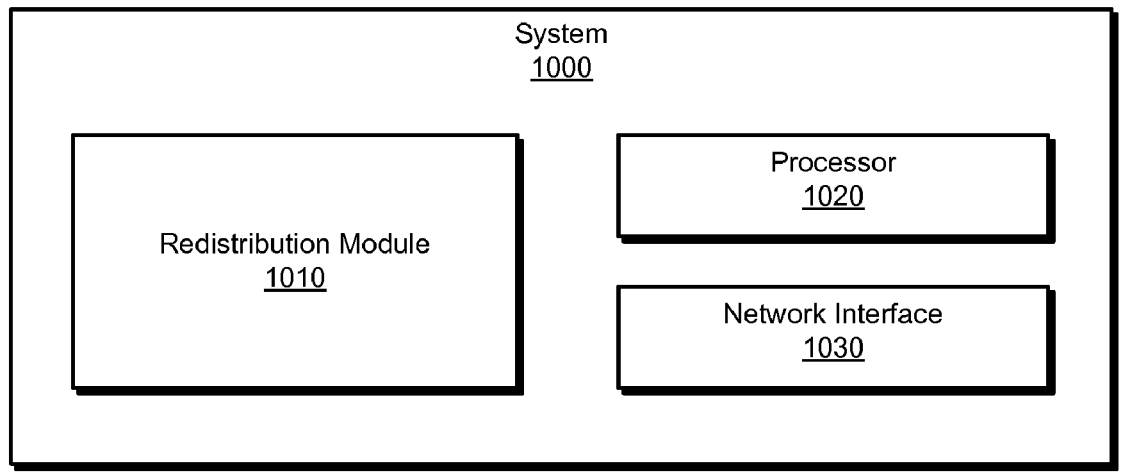
FIG. 10 is a block diagram of an exemplary system for redistributing lock mastership.

FIG. 10 illustrates an exemplary system 1000 for redistributing lock mastership. As used herein, "mastership" or "lock mastership" may include any resource management responsibility as described above. System 1000 may include redistribution module 1010, processor 1020, and network interface 1030. Processor 1020 may be configured to execute at least a portion of redistribution module 1010. Redistribution module 1010 may access network interface 1030 to receive information about lock mastership distribution or to implement a redistribution of lock mastership.

As will be described in greater detail below, redistribution module 1010 may be programmed to identify a set of discrete computing-resource portions. As used herein, a "discrete computing-resource portion" may refer to a region of responsibility as described earlier. The set of discrete computing-resource portions may be co-extensive with the resource identification space described earlier. Redistribution module 1010 may also identify a cluster of nodes, where each node has lock mastership over a subset of the discrete computing-resource portions, identify a cluster event that requires a redistribution of lock mastership, and determine a new mastership load distribution to apply across the cluster of nodes. Redistribution module 1010 may then deallocate a sufficient number of discrete computing-resource portions from network nodes that are over a target number, identify a set of those deallocated computing-resource portions, and allocate to the lock mastership of the nodes a sufficient number of the deallocated discrete computing-resource portions to reach the target number for each node.

In certain embodiments, redistribution module 1010 may represent one or more software applications or programs that, when executed by a computing system, may cause the computing system to perform one or more of the steps disclosed herein. For example, as will be described in greater detail below, redistribution module 1010 may represent software modules configured to run on one or more computing devices, such as computing system 810 in FIG. 8 and/or portions of exemplary network architecture 900 in FIG. 9. Redistribution module 1010 may also represent all or portions of one or more special-purpose computers configured to perform one or more tasks associated with the steps disclosed herein.

Figure 11:
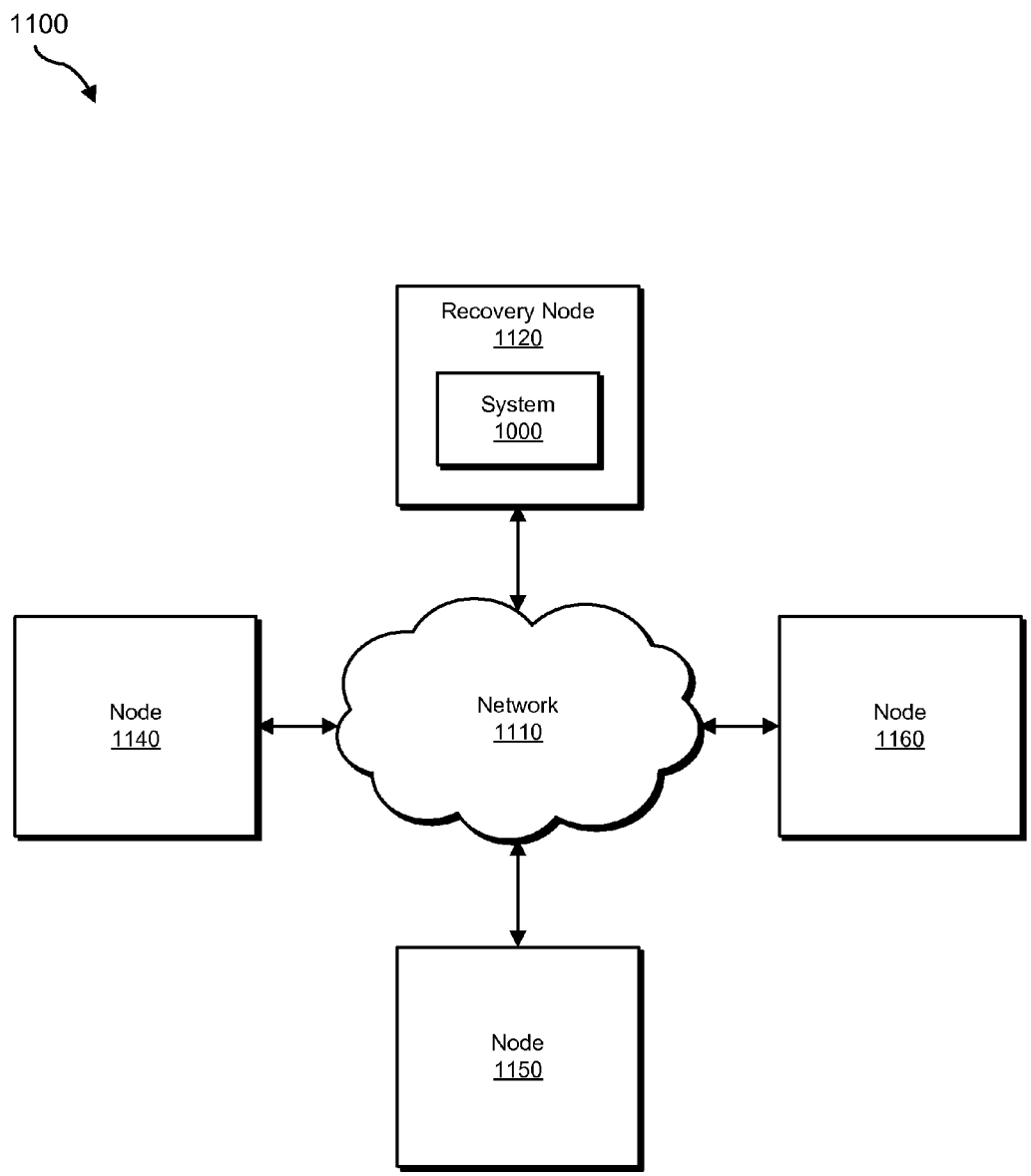
FIG. 11 is a block diagram of an exemplary computing cluster across which lock mastership may be redistributed.

FIG. 11 is a block diagram of an exemplary cluster 1100 in which a network 1110 may connect a recovery node 1120 and nodes 1140, 1150, and 1160. Recovery node 1120 and nodes 1140, 1150, and 1160 may include some of nodes 110(1)-110(n) illustrated in FIG. 1. Recovery node 1120 and nodes 1140, 1150, and 1160 may generally represent any type or form of computing device capable of reading computer-executable instructions. Examples of nodes 1120, 1140, 1150, and 1160 may include, without limitation, laptops, desktops, servers, cellular phones, personal digital assistants (PDAs), multimedia players, embedded systems, combinations of one or more of the same, exemplary computing system 810 in FIG. 8, or any other suitable computing device. Recovery node 1120 may include system 1000 of FIG. 10.

Recovery node 1120 and each of nodes 1140, 1150, and 1160 may have mastership over discrete computing-resource portions. For example, each node may control access to a certain set of files. When the discrete computing-resource portions need redistribution, redistribution module 1010 of FIG. 10 may run on system 1000 on recovery node 1120. Redistribution module 1010 may then propagate the redistribution to nodes 1140, 1150, and 1160 through network 1110. In some alternative embodiments, redistribution module

1010 may function on multiple nodes, so that each node may independently arrive at the same result.

Figure 12:
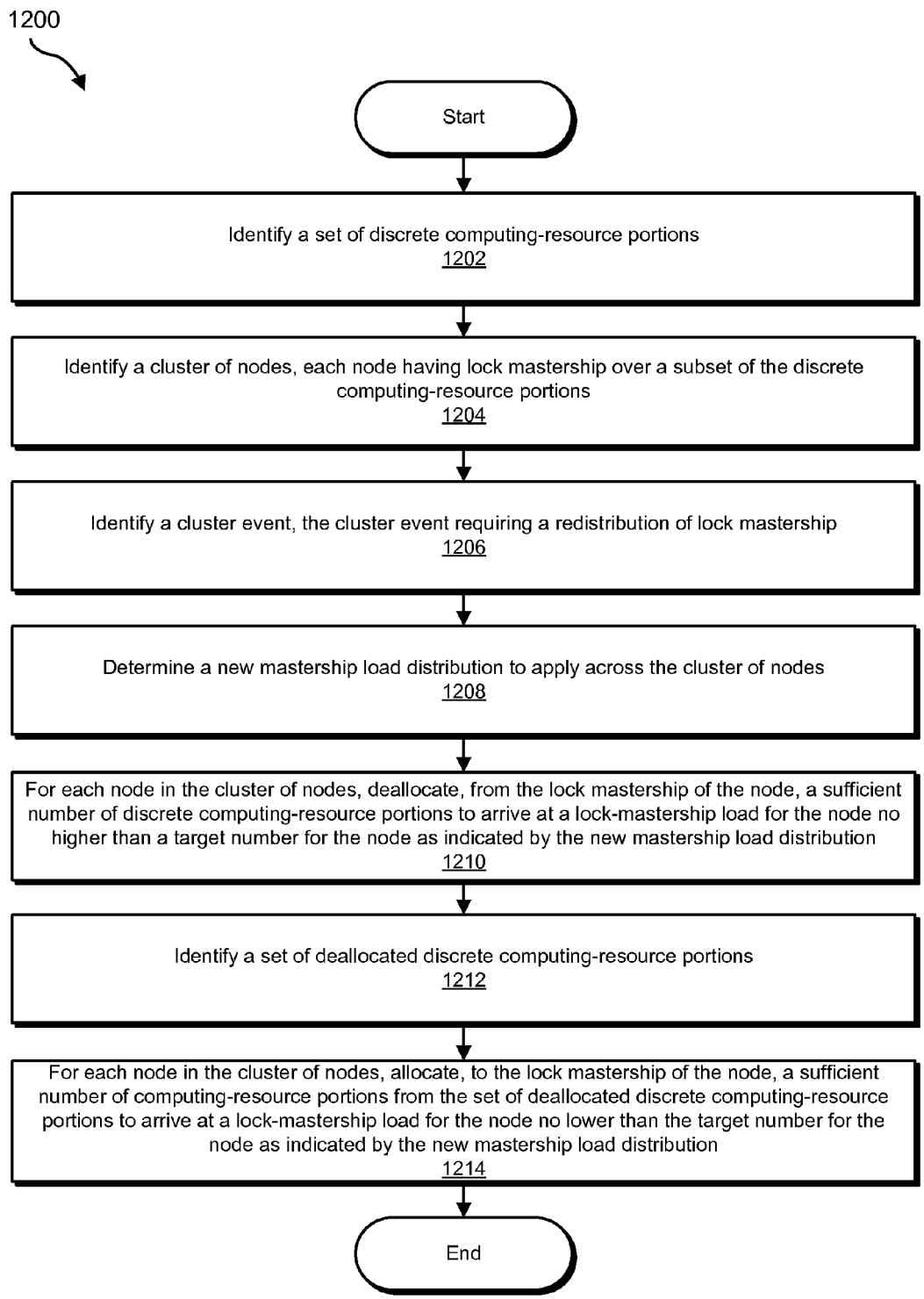
FIG. 12 is a flow diagram of an exemplary method for redistributing lock mastership.

FIG. 12 illustrates an exemplary method 1200 for redistributing lock mastership. In some embodiments, the steps in FIG. 12 may be performed by redistribution module 1010. For example, at step 1202 redistribution module 1010 in FIG. 10 may identify a set of discrete computing-resource portions. A discrete computing-resource portion may include a part of any computing resource that is sensitive to concurrency problems. For example, a discrete computing-resource portion may include part of a storage device, such as a SAN.

In some embodiments, a discrete computing-resource portion may include a group of discrete computing-resource parcels. As used herein, a "discrete computing-resource parcel" may correspond to an identifier in the plurality of resource identifiers as described earlier. Additionally or alternatively, a discrete computing-resource parcel may include a part of any computing resource that is sensitive to concurrency problems. The discrete computing-resource portion may include all discrete computing-resource parcels that share a same hash value according to a hash function. In other words, a computing resource may be divided into computing-resource parcels, which may be grouped, according to a hash function, into discrete computing-resource portions. For example, a file system may include 512 files. Access to each file may constitute a computing-resource parcel. A hash function may accept a filename and return a value corresponding to one of 16 slots. A slot may correspond to a discrete computing-resource portion, and the value contained by the slot may correspond to a node. If the hash function is balanced, the discrete computing-resource portion corresponding to each slot may correspond to 32 files.

Redistribution module 1010 may identify the set of discrete computing-resource portions in any suitable manner, such as by reading a list of the set from a storage device included in recovery node 1120 of FIG. 11 or by receiving a list of the set through network interface 1030 of FIG. 10.

Returning to FIG. 12, at step 1204 redistribution module 1010 may identify a cluster of nodes. Each node may have lock mastership over a subset of the discrete computing-resource portions. A subset may consist of multiple discrete computing-resource portions, just one discrete computing-resource portion, or none. Lock mastership over a discrete computing-resource portion may include control over access to the discrete computing-resource portion or its constituent parcels. For example, lock mastership over a file may allow a node to grant shared or exclusive access of the discrete computing-resource portion. Shared access may include access to read from the file. Multiple clients may simultaneously have shared access rights to read the file. Exclusive access may include access to write to the file. Exclusive access may permit access to one client at a time only.

Redistribution module 1010 may identify the cluster of nodes in any suitable manner, such as by reading a list of nodes in the cluster from a storage device included in recovery node 1120 of FIG. 11 or by receiving a list of nodes in the cluster through network interface 1030 of FIG. 10.

Returning to FIG. 12, at step 1206 redistribution module 1010 may identify a cluster event. The cluster event may include any event requiring a redistribution of lock mastership in the cluster of nodes. For example, the cluster event may include an addition of a node to the cluster of nodes, a removal of a node from the cluster of nodes, or a change of a weight of a node in the cluster of nodes. The removal of a node from the cluster of nodes may include a cluster administrator removing the node or the node losing operational capacity (e.g., a system crash).

A weight of a node may include any indication of the number of discrete-computing resource portions over which the node should have mastership relative to the other nodes in the cluster of nodes. For example, the weight of a node may indicate the relative capability of the node as described earlier.

Redistribution module 1010 may identify the cluster event in any suitable manner, such as receiving a notice of the cluster event via network interface 1030. In some cases, redistribution module 1010 may identify the cluster event when recovery node 1120 is added or the weight of recovery node 1120 is changed.

Returning to FIG. 12, at step 1208 redistribution module 1010 may determine a new mastership load distribution to apply across the cluster of nodes. The new mastership load distribution may include any indication of the number of discrete computing-resource portions over which each node in the cluster of nodes is to have lock mastership. Redistribution module 1010 may determine the new mastership load distribution in any suitable manner. For example, redistribution module 1010 may determine the new mastership load distribution by identifying a weight for each node in the cluster of nodes and calculating, based on the weight of each node, a target number of discrete computing-resource portions for the lock mastership of the node. Redistribution module 1010 may identify the weight for each node in any suitable manner. For example, redistribution module 1010 may receive the weight of a node from the node through network interface 1030.

In some embodiments, redistribution module 1010 may calculate the target number of discrete computing-resource portions for the lock mastership of the node by identifying a cardinality of the set of discrete computing-resource portions and then apportioning a percentage of the cardinality to the node based on the weight of the node. Redistribution module 1010 may apportion the percentage of the cardinality in accordance with a percentage of the weight of the node relative to a total weight of all nodes in the cluster of nodes. For example, in reference to the exemplary drawing of FIG. 11, recovery node 1120 may have a weight of 3, node 1140 may have a weight of 5, node 1150 may have a weight of 7, and node 1160 may have a weight of 5. The total weight of all nodes may be 20. The percentage of the weight of node 1140 relative to the total weight may be 25 percent. The cardinality of the set of discrete computing-resource portions may be 16. Accordingly, the target number for node 1140 may be 25 percent of 16, or 4.

Returning to FIG. 12, at step 1210, redistribution module 1010 may, for each node in the cluster of nodes, deallocate a sufficient number of discrete computing-resource portions from the lock mastership of the node to arrive at a lock-mastership load for the node no higher than the target number for the node as indicated by the new mastership load distribution. The sufficient number to deallocate from a node may be zero when the target number for the node is greater than or equal to the current number of masterships. Redistribution module 1010 may deallocate the discrete computing-resource portions in any suitable manner.

In some embodiments, redistribution module 1010 may deallocate the discrete computing-resource portions by modifying an allocation array. The allocation array may use a hash corresponding to a discrete computer-resource portion to index which node has mastership over the discrete computer-resource portion. Redistribution module 1010 may modify the allocation array and deallocate the discrete computing-resource portions by, first, identifying the allocation array and initializing an appearances array to comprise the new mastership load distribution. Each element of the appearances array may correspond to the target number for the node at the given index of the appearances array. Redistribution module 1010 may initialize the appearances array with the following formula:

appear[*i*]=node *i* weight*size of allocation array/total weight of nodes where appear is the appearances array and appear[i] is an element in the appearances array at index i. Due to rounding imprecision, redistribution module 1010 may further adjust the appearances array so that the sum of the elements in the appearances array matches the number of discrete computer-resource portions. For example, redistribution module 1010 may act in conformance with the following pseudo-code:

```
deficit = size of allocation array
for each node i
    appear[i] = node i weight * size of allocation array/total weight of nodes
    deficit -= appear[i]
done
for each node i
    if deficit == 0
        break
    if appear[i] == 0
        continue
    appear[i] += 1
    deficit -= 1
done
``` where deficit tracks the number of discrete computer-resource portions left to account for after all rounding errors.

After identifying the allocation array and initializing the appearances array, redistribution module 1010 may identify an assigned node from a part of the allocation array corresponding to each computing-resource portion and identify a remaining number in the appearances array corresponding to the assigned node. If the remaining number is zero, redistribution module 1010 may mark the part of the allocation array corresponding to the discrete computing-resource portion as without any node. Otherwise, if the remaining number is not zero, redistribution module 1010 may decrement the remaining number. For example, redistribution module 1010 may act in conformance with the following pseudo-code:

```
for each hash value h
    n = allocation[h]
    if appear[n] == 0
        allocation[h] = -1
    else
        appear[n] -= 1
    fi
done
``` where −1 is a value used in the allocation array to indicate no assigned node.

Returning to FIG. 12, at step 1212 redistribution module 1010 may identify a set of deallocated discrete computing-resource portions. Redistribution module 1010 may identify the set of deallocated discrete computing-resource portions in any suitable manner. For example, in the context of the pseudo-code presented in the description of step 1210, redistribution module 1010 may identify all elements of the allocation array with a value of −1.

After identifying the set of deallocated discrete computing-resource portions, at step 1214 redistribution module 1010 may, for each node in the cluster of nodes, allocate a sufficient number of discrete computing-resource portions to the lock mastership of the node from the set of deallocated discrete computing-resource portions to arrive at a lock-mastership load for the node no lower than the target number for the node as indicated by the new mastership load distribution. The sufficient number to allocate to a node may be zero when the target number for the node is equal to the current number of masterships. Redistribution module 1010 may allocate the sufficient number of discrete computing-resource portions in any suitable manner.

In some embodiments, redistribution module 1010 may allocate the sufficient number of discrete computing-resource portions by finding, for each computing-resource portion in the set of deallocated computing-resource portions, an available node that corresponds to a non-zero part of the appearances array. Redistribution module 1010 may then mark a part of the allocation array corresponding to the discrete computing-resource portion as assigned to the available node and decrement the non-zero part of the appearances array. For example, redistribution module 1010 may act in accordance with the following pseudo-code:

```
for each hash value h
    if allocation[h] == -1
        let i be index of first non-zero entry in appear
        allocation[h] = i
        appear[i] -= 1
    fi
done
```

After step 1214, redistribution module 1010 may implement the new mastership load distribution by transmitting the new mastership load distribution to at least one node in the cluster of nodes. Redistribution module 1010 may transmit the new mastership load distribution by any suitable method, such as transmitting the entire allocation array to the node or transmitting a minimum set of changes required to reconfigure the node to the node. For example, if only four entries in the allocation array changed, redistribution module 1010 may transmit information pertaining to the four changed entries only.

For the sake of clarity, and by way of example only, FIG. 13 illustrates an exemplary transformation 1300 of one lock mastership distribution to another lock mastership distribution. Transformation 1300 may include states 1302, 1304, 1306, 1308, and 1310, each of which may represent the allocation array described above at various stages of redistribution. The exemplary allocation array of transformation 1300 may have 16 elements, with each element indexed by a hash value representing a discrete computing-resource portion and containing a value representing a node in the cluster of nodes. Transformation 1300 may represent the redistribution of lock mastership across a cluster of four nodes (numbered 0, 1, 2, and 3) after node 0 first crashes, and then rejoins the cluster along with a new node, node 4, is added. Nodes 0 through 3 may have an initial weight of 10.

At state 1302, the allocation array may show lock masterships for four discrete computing-resource portions allocated to each node. Redistribution module 1010 may initialize the appearances array to reflect a new mastership load distribution to enact after the removal of node 0:

| | |
|---|---|
| appear[0] | 0 |
| appear[1] | 6 |
| appear[2] | 5 |
| appear[3] | 5 | where appear[1] shows a larger mastership load despite equal weights due to an allocation adjustment after rounding errors.

At state 1304, after performing the deallocation described above in step 1210, all elements in the allocation array representing a mastership of node 0 may have been changed to X to reflect no node assigned with the corresponding discrete computing-resource portion. At this point, the appearances array may also have changed to reflect that number of additional mastership assignments to be made in the allocation array for each node:

| | |
|---|---|
| appear[0] | 0 |
| appear[1] | 2 |
| appear[2] | 1 |
| appear[3] | 1 |

At state 1306, after performing the allocation described above in step 1214, the first four elements of the allocation array may have been changed to reflect new node masterships. From state 1302 to state 1306, only four masterships may have changed. Redistribution module 1010 may then transmit the new mastership load distribution to the cluster. At this point, node 0 may rejoin the cluster, and node 4 may join as well. While nodes 0 through 3 may have a weight of 10, node 4 may have a weight of 5. Redistribution module 1010 may identify the addition of nodes as cluster events and initialize the appearances array:

| | |
|---|---|
| appear[0] | 4 |
| appear[1] | 4 |
| appear[2] | 3 |
| appear[3] | 3 |
| appear[4] | 2 |

At state 1308, after performing the deallocation described above in step 1210, two masterships from each of nodes 1, 2, and 3 may be deallocated, since each of nodes 1-3 each had two masterships more than their target number as set in the appearances array. The appearances array may also update to reflect the deallocation:

| | |
|---|---|
| appear[0] | 4 |
| appear[1] | 0 |
| appear[2] | 0 |
| appear[3] | 0 |
| appear[4] | 2 |

At state 1310, after performing the allocation described above in step 1214, four masterships for node 0 may be allocated from the deallocated discrete computing-resource portions, as well as two masterships for node 4. The transformation from state 1306 to state 1310 may have involved the changes of only six masterships.

As detailed above, computing system 810 and/or one or more components of network architecture 900 may perform and/or be a means for performing, either alone or in combination with other elements, one or more steps of the exemplary methods described herein. For example, a computing system (e.g., computing system 810 and/or one or more of the components of network architecture 900) may perform a computer-implemented method for redistributing lock mastership. The computing system may identify a set of discrete computing-resource portions, identify a cluster of nodes where each node has lock mastership over a subset of the discrete computing-resource portions, identify a cluster event requiring redistribution of lock mastership, and determine a new mastership load distribution to apply across the cluster of nodes.

The computing system may then, for each node in the cluster of nodes, deallocate, from the lock mastership of the node, a sufficient number of discrete computing-resource portions to arrive at a lock-mastership load for the node no higher than a target number for the node as indicated by the new mastership load distribution. The computing system may further identify a set of deallocated discrete computing-resource portions and, for each node in the cluster of nodes, allocate, to the lock mastership of the node, a sufficient number of discrete computing-resource portions from the set of deallocated discrete computing-resource portions to arrive at a lock-mastership load for the node no lower than the target number for the node as indicated by the new mastership load distribution.

In some embodiments, the cluster event may comprise an addition of a node to the cluster of nodes, a removal of a node from the cluster of nodes, and/or a change of weight of a node in the cluster of nodes. In certain further embodiments, the removal of the node from the cluster of nodes may comprise a cluster administrator removing the node and/or the node losing operational capacity.

In various embodiments, determining a new mastership load distribution to apply across the cluster of nodes may comprise, for each node in the cluster of nodes, identifying a weight for the node and calculating, based on the weight of the node, a target number of discrete computing-resource portions for the lock-mastership of the node. According to some further embodiments, calculating the target number may comprise identifying a cardinality of the set of discrete computing-resource portions and apportioning a percentage of the cardinality to the node in accordance with a percentage of the weight of the node relative to a total weight of all nodes in the cluster of nodes. In some embodiments, identifying the weight for the node may comprise receiving the weight from the node.

According to some embodiments, a discrete computing-resource portion may comprise a group of discrete computing-resource parcels. In some further embodiments, the group of discrete computing-resource parcels may comprise all discrete computing-resource parcels that share a same hash value according to a hash function.

In certain embodiments, deallocating the sufficient number of discrete computing-resource portions from the lock mastership of the node may comprise initializing an appearances array to comprise the new mastership load distribution, identifying an allocation array that comprises nodes to which lock mastership of a subset of discrete computing-resource portions is allocated, and, for each discrete computing-resource portion, identifying an assigned node from a part of the allocation array corresponding to the discrete computing-resource portion, identifying a remaining number in the appearances array corresponding to the assigned node, and marking the part of the allocation array corresponding to the discrete computing-resource portion as without any node if the remaining number is zero while decrementing the remaining number if it is not zero.

In a number of embodiments, allocating the sufficient number of discrete computing-resource portions to the lock mastership of the node may comprise, for each computing-resource portion in the set of deallocated computing-resource portions, finding an available node that corresponds to a non-zero part of the appearances array, marking a part of the allocation array corresponding to the discrete computing-resource portion as assigned to the available node, and decrementing the non-zero part of the appearances array.

According to some embodiments, the computing system may transmit the new mastership load distribution to at least one node in the cluster of nodes. In some further embodiments, transmitting the new mastership load distribution may comprise transmitting a minimum set of changes required to reconfigure the node.

Other Embodiments

The present disclosure is well adapted to attain the advantages mentioned as well as others inherent therein. While the present disclosure has been depicted, described, and is defined by reference to particular embodiments of the disclosure, such references do not imply a limitation on the disclosure, and no such limitation is to be inferred. The disclosure is capable of considerable modification, alteration, and equivalents in form and function, as will occur to those ordinarily skilled in the pertinent arts. The depicted and described embodiments are examples only, and are not exhaustive of the scope of the disclosure.

The foregoing describes embodiments including components contained within other components (e.g., the various elements shown as components of computer system 810). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present disclosure via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present disclosure has been described in the context of fully functional computer systems; however, those skilled in the art will appreciate that the present disclosure is capable of being distributed as a program product in a variety of forms, and that the present disclosure applies equally regardless of the particular type of signal bearing media used to actually carry out the distribution. Examples of signal bearing media include computer-readable storage media, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the disclosure can also include a semiconductor-based memory, which may be permanently, removably, or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the disclosure and should not be taken to be limiting. Other embodiments within the scope of the present disclosure are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the disclosure. Variations and modifications of the embodiments disclosed herein can be made based on the description set forth herein, without departing from the scope of the disclosure.

Consequently, the disclosure is intended to be limited only by the scope of the appended claims, giving full cognizance to equivalents in all respects.

We claim:

1. A computer-implemented method for redistributing lock mastership, at least a portion of the method being performed by a computing system comprising at least one processor, the method comprising:
    identifying a set of discrete computing-resource portions;
    identifying a cluster of nodes, each node having lock mastership over a subset of the discrete computing-resource portions;
    identifying a cluster event, the cluster event requiring a redistribution of lock mastership;
    determining a new mastership load distribution to apply across the cluster of nodes;
    for each node in the cluster of nodes:
        deallocating, from the lock mastership of the node, a sufficient number of discrete computing-resource portions to arrive at a lock-mastership load for the node no higher than a target number for the node as indicated by the new mastership load distribution, wherein deallocating, from the lock mastership of the node, the sufficient number of discrete computing-resource portions comprises:
            initializing an appearances array to comprise the new mastership load distribution;
            identifying an allocation array, the allocation array comprising nodes to which lock-mastership of a subset of discrete computing-resource portions is allocated;
        for each discrete computing-resource portion:
            identifying an assigned node from a part of the allocation array corresponding to the discrete computing-resource portion;
            identifying a remaining number in the appearances array corresponding to the assigned node;

if the remaining number is zero:
    marking the part of the allocation array corresponding to the discrete computing-resource portion as without any node;
if the remaining number is not zero:
    decrementing the remaining number;
identifying a set of deallocated discrete computing-resource portions;
for each node in the cluster of nodes:
    allocating, to the lock mastership of the node, a sufficient number of discrete computing-resource portions from the set of deallocated discrete computing-resource portions to arrive at a lock-mastership load for the node no lower than the target number for the node as indicated by the new mastership load distribution.

2. The computer-implemented method of claim 1, wherein the cluster event comprises at least one of:
an addition of a node to the cluster of nodes;
a removal of a node from the cluster of nodes;
a change of a weight of a node in the cluster of nodes.

3. The computer-implemented method of claim 2, wherein the removal of the node from the cluster of nodes comprises at least one of:
a cluster administrator removing the node;
the node losing operational capacity.

4. The computer-implemented method of claim 1, wherein determining a new mastership load distribution to apply across the cluster of nodes comprises:
for each node in the cluster of nodes:
    identifying a weight for the node;
    calculating, based on the weight of the node, a target number of discrete computing-resource portions for the lock mastership of the node.

5. The computer-implemented method of claim 4, wherein calculating the target number of discrete computing-resource portions for the lock-mastership of the node comprises:
identifying a cardinality of the set of discrete computing-resource portions;
apportioning a percentage of the cardinality to the node in accordance with a percentage of the weight of the node relative to a total weight of all nodes in the cluster of nodes.

6. The computer-implemented method of claim 4, wherein identifying the weight for the node comprises receiving the weight from the node.

7. The computer-implemented method of claim 1, wherein a discrete computing-resource portion comprises a group of discrete computing-resource parcels.

8. The computer-implemented method of claim 7, wherein the group of discrete computing-resource parcels comprises all discrete computing-resource parcels that share a same hash value according to a hash function.

9. The computer-implemented method of claim 1, wherein allocating, to the lock mastership of the node, a sufficient number of discrete computing-resource portions comprises:
for each computing-resource portion in the set of deallocated computing-resource portions:
    finding an available node, the available node comprising a node corresponding to a non-zero part of the appearances array;
    marking a part of the allocation array corresponding to the discrete computing-resource portion as assigned to the available node;
    decrementing the non-zero part of the appearances array.

10. The computer-implemented method of claim 1, further comprising transmitting the new mastership load distribution to at least one node in the cluster of nodes.

11. The computer-implemented method of claim 10, wherein transmitting the new mastership load distribution to at least one node in the cluster of nodes comprises transmitting a minimum set of changes required to reconfigure the node to reflect the new mastership load distribution.

12. A system for redistributing lock mastership comprising:
a redistribution module programmed to:
    identify a set of discrete computing-resource portions;
    identify a cluster of nodes, each node having lock mastership over a subset of the discrete computing-resource portions;
    identify a cluster event, the cluster event requiring a redistribution of lock mastership;
    determine a new mastership load distribution to apply across the cluster of nodes;
    for each node in the cluster of nodes:
        deallocate, from the lock mastership of the node, a sufficient number of discrete computing-resource portions to arrive at a lock-mastership load for the node no higher than a target number for the node as indicated by the new mastership load distribution, wherein the redistribution module is programmed to deallocate, from the lock mastership of the node, the sufficient number of discrete computing-resource portions by:
            initializing an appearances array to comprise the new mastership load distribution;
            identifying an allocation array, the allocation array comprising nodes to which lock-mastership of a subset of discrete computing-resource portions is allocated;
        for each discrete computing-resource portion:
            identifying an assigned node from a part of the allocation array corresponding to the discrete computing-resource portion;
            identifying a remaining number in the appearances array corresponding to the assigned node;
            if the remaining number is zero:
                marking the part of the allocation array corresponding to the discrete computing-resource portion as without any node;
            if the remaining number is not zero:
                decrementing the remaining number;
        identify a set of deallocated discrete computing-resource portions;
    for each node in the cluster of nodes:
        allocate, to the lock mastership of the node, a sufficient number of discrete computing-resource portions from the set of deallocated computing-resource portions to arrive at a lock-mastership load for the node no lower than the target number for the node as indicated by the new mastership load distribution;
one or more processors configured to execute the redistribution module.

13. The system of claim 12, wherein the cluster event comprises at least one of:
an addition of a node to the cluster of nodes;
a removal of a node from the cluster of nodes;
a change of a weight of a node in the cluster of nodes.

14. The system of claim 13, wherein the removal of the node from the cluster of nodes comprises at least one of:
a cluster administrator removing the node;
the node losing operational capacity.

15. The system of claim 12, wherein the redistribution module is programmed to determine a new mastership load distribution to apply across the cluster of nodes by:
for each node in the cluster of nodes:
identifying a weight for the node;
calculating, based on the weight of the node, a target number of discrete computing-resource portions for the lock mastership of the node.

16. The system of claim 15, wherein the redistribution module is programmed to calculate the target number of discrete computing-resource portions for the lock-mastership of the node by:
identifying a cardinality of the set of discrete computing-resource portions;
apportioning a percentage of the cardinality to the node in accordance with a percentage of the weight of the node relative to a total weight of all nodes in the cluster of nodes.

17. The system of claim 12, wherein a discrete computing-resource portion comprises a group of discrete computing-resource parcels.

18. The system of claim 17, wherein the group of discrete computing-resource parcels comprises all discrete computing-resource parcels that share a same hash value according to a hash function.

19. A non-transitory computer-readable-storage medium comprising one or more computer-executable instructions that, when executed by a computing device, cause the computing device to:
identify a set of discrete computing-resource portions;
identify a cluster of nodes, each node having lock mastership over a subset of the discrete computing-resource portions;
identify a cluster event, the cluster event requiring a redistribution of lock mastership;
determine a new mastership load distribution to apply across the cluster of nodes;
for each node in the cluster of nodes:
deallocate, from the lock mastership of the node, a sufficient number of discrete computing-resource portions to arrive at a lock-mastership load for the node no higher than a target number for the node as indicated by the new mastership load distribution, wherein deallocating, from the lock mastership of the node, the sufficient number of discrete computing-resource portions comprises:
initializing an appearances array to comprise the new mastership load distribution;
identifying an allocation array, the allocation array comprising nodes to which lock-mastership of a subset of discrete computing-resource portions is allocated;
for each discrete computing-resource portion:
identifying an assigned node from a part of the allocation array corresponding to the discrete computing-resource portion;
identifying a remaining number in the appearances array corresponding to the assigned node;
if the remaining number is zero:
marking the part of the allocation array corresponding to the discrete computing-resource portion as without any node;
if the remaining number is not zero:
decrementing the remaining number;
identify a set of deallocated discrete computing-resource portions;
for each node in the cluster of nodes:
allocate, to the lock mastership of the node, a sufficient number of discrete computing-resource portions from the set of deallocated discrete computing-resource portions to arrive at a lock-mastership load for the node no lower than the target number for the node as indicated by the new mastership load distribution.

20. The system of claim 12, wherein the redistribution module is programmed to allocate, to the lock mastership of the node, a sufficient number of discrete computing-resource portions by:
for each computing-resource portion in the set of deallocated computing-resource portions:
finding an available node, the available node comprising a node corresponding to a non-zero part of the appearances array;
marking a part of the allocation array corresponding to the discrete computing-resource portion as assigned to the available node;
decrementing the non-zero part of the appearances array.

* * * * *